US010561264B2

(12) United States Patent
McRae

(10) Patent No.: US 10,561,264 B2
(45) Date of Patent: Feb. 18, 2020

(54) BATTERY-POWERED TREE

(71) Applicant: National Tree Company, Cranford, NJ (US)

(72) Inventor: Michael M. McRae, Ormond Beach, FL (US)

(73) Assignee: National Christmas Products LLC, Cranford, NJ (US)

(*) Notice: Subject to any disclaimer, the term of this patent is extended or adjusted under 35 U.S.C. 154(b) by 0 days.

(21) Appl. No.: 15/468,747

(22) Filed: Mar. 24, 2017

(65) Prior Publication Data

US 2018/0271314 A1  Sep. 27, 2018

(51) Int. Cl.
*A41G 1/00* (2006.01)
*A47G 33/06* (2006.01)
(Continued)

(52) U.S. Cl.
CPC .............. *A47G 33/06* (2013.01); *A41G 1/005* (2013.01); *A47G 33/08* (2013.01); *F21S 9/03* (2013.01);
(Continued)

(58) Field of Classification Search
CPC ................ A47G 33/06; A47G 33/08; A47G 2033/0827; F21V 23/06; F21V 23/008;
(Continued)

(56) References Cited

U.S. PATENT DOCUMENTS 1,823,021 A * 9/1931 Becker .................. A47G 33/06
315/76

3,176,123 A * 3/1965 Blake ..................... A47G 33/06
362/123

(Continued)

FOREIGN PATENT DOCUMENTS

| CA | 2460040 | 10/2003 |
| CN | 201057936 | 5/2008 |
| GB | 2035789 | 6/1980 |

OTHER PUBLICATIONS

Canadian Examiner Report dated Sep. 21, 2018, in counterpart Canadian application 2,976,476.
Canadian Examiner Report dated Jul. 17, 2019, in counterpart Canadian application 2,976,476.

*Primary Examiner* — William J Carter
*Assistant Examiner* — Omar Rojas Cadima
(74) *Attorney, Agent, or Firm* — Ellenoff Grossman & Schole LLP; James M. Smedley; Alex Korona

(57) ABSTRACT

Apparatus and associated methods relate to a battery-powered lighted tree formed from an artificial tree trunk adapted to be mechanically supported and electrically connected to a support structure external to the tree, artificial tree branches extending from the trunk, a light source disposed to emit light from a branch and electrically connected to the trunk, and, a base, formed from a battery, and, a structure adapted to mechanically support the trunk and electrically connect the trunk to the battery. In an illustrative example, the light source may be an LED-illuminated optic fiber. In some embodiments, the battery may be charged from a solar cell. Some designs may provide customizable illumination patterns using a programmable controller adapted to control the light source. Various embodiments may advantageously operate from battery for a seasonal display, for example, using lights and battery selected to provide a sufficient period of illumination each display season day.

18 Claims, 7 Drawing Sheets

(51) Int. Cl.
  *A47G 33/08* (2006.01)
  *F21S 9/03* (2006.01)
  *F21V 23/00* (2015.01)
  *F21V 23/02* (2006.01)
  *F21V 23/06* (2006.01)
  *F21V 8/00* (2006.01)
  *F21Y 115/10* (2016.01)
  *F21W 121/04* (2006.01)

(52) U.S. Cl.
  CPC .......... *F21V 23/008* (2013.01); *F21V 23/023* (2013.01); *F21V 23/06* (2013.01); *G02B 6/0006* (2013.01); *A47G 2033/0827* (2013.01); *A47G 2200/08* (2013.01); *F21W 2121/04* (2013.01); *F21Y 2115/10* (2016.08)

(58) Field of Classification Search
  CPC ........ F21V 23/023; F21S 9/03; G02B 6/0006; F21Y 2115/10; F21W 2121/04
  USPC .................................................. 362/567, 568
  See application file for complete search history.

(56) References Cited

U.S. PATENT DOCUMENTS

| | | | | |
|---|---|---|---|---|
| 3,571,586 A * | 3/1971 | Duckworth | ............ | A47G 33/06 362/123 |
| 3,624,385 A * | 11/1971 | Wall | .................... | A47G 33/0836 362/122 |
| 4,923,721 A * | 5/1990 | Gilmore | ............. | A47G 33/0809 315/185 S |
| 5,852,348 A * | 12/1998 | Lin | ......................... | F21V 23/00 315/185 R |
| 2004/0212997 A1 * | 10/2004 | Ballarini | .................. | A45B 3/04 362/249.01 |
| 2006/0246235 A1 * | 11/2006 | Lin | ........................... | G09F 1/06 428/18 |
| 2008/0285279 A1 * | 11/2008 | Ng | ..................... | H05B 33/0803 362/249.01 |
| 2015/0359066 A1 * | 12/2015 | Loomis | .............. | H05B 37/0245 362/123 |

* cited by examiner

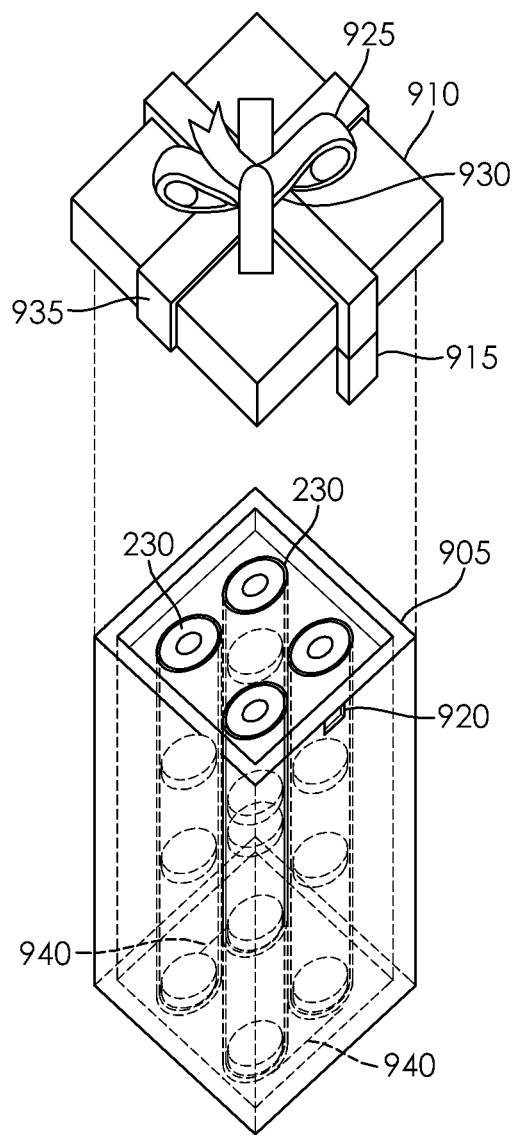
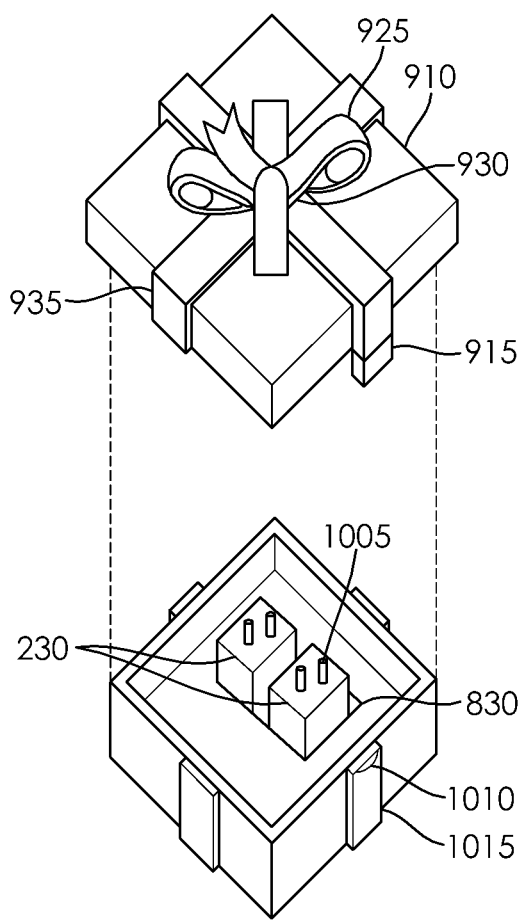
FIG. 9
FIG. 10

BATTERY-POWERED TREE

TECHNICAL FIELD

Various embodiments relate generally to illuminated artificial trees.

BACKGROUND

Artificial trees are trees that are not natural trees. Artificial trees do not occur as a product of nature. Artificial trees are a product of human construction activity. Some artificial trees may have a trunk and branches approximating the form of a natural tree. Artificial trees may be displayed in place of a natural tree. An artificial tree may be constructed from a variety of materials. Constructing an artificial tree from some materials may aid conservation of the natural environment. For example, some artificial trees may be constructed from plastic or metal. Artificial trees may be constructed to various heights. Some artificial trees may be very tall.

Users of artificial trees include individuals and organizations. Users may employ artificial trees to display decoration for a special occasion. Many artificial trees are illuminated with visible light. Artificial trees may display visible lights located in various parts of the tree, including the trunk or branches. Some artificial trees display many lights. Some artificial trees may display various groups of lights at different times. For example, the lights displayed by some artificial trees may be turned on and off in groups to display various lighting patterns. In some artificial trees, lighting patterns may include multiple lights of various colors at different times. Some artificial trees employ a single light in the base of the tree. Optical fibers may couple a light in the base to the trunk or branches. Lights may be dim near the top of taller trees with long optical fibers coupled to a light in the base of the tree, due to optical loss in the long optical fiber. Some artificial trees change the displayed lighting color over time by directing the light through a rotating color wheel.

An artificial tree may require significant electrical energy. Very tall artificial trees may have many lights. An artificial tree with many lights may consume more energy and cost more to operate than a shorter tree with fewer lights. The illumination in some artificial trees may remain active for extended periods of time. For example, an artificial tree employed by a retail business storefront may remain active for several months. An artificial tree with many lights may consume more electrical energy. Artificial trees employing a motorized rotating color wheel may require additional electrical energy to rotate the color wheel. Increased consumption of electrical energy to illuminate lights in an artificial tree may impact the environment and increase the operating cost of the tree.

SUMMARY

Apparatus and associated methods relate to a battery-powered lighted tree formed from an artificial tree trunk adapted to be mechanically supported and electrically connected to a support structure external to the tree, artificial tree branches extending from the trunk, a light source disposed to emit light from a branch and electrically connected to the trunk, and a base, formed from a battery, and a structure adapted to mechanically support the trunk and electrically connect the trunk to the battery. In an illustrative example, the light source may be an LED-illuminated optic fiber. In some embodiments, the battery may be charged from a solar cell. Some designs may provide customizable illumination patterns using a programmable controller adapted to control the light source. Various embodiments may advantageously operate by battery for a seasonal display, for example, using lights and a battery selected to provide a sufficient period of illumination each display season day.

Various embodiments may achieve one or more advantages. For example, some embodiments may reduce the cost associated with displays having many illuminated artificial trees. This facilitation may be a result of powering an illuminated tree from solar energy. In some examples, a user's effort to maintain a battery-operated illuminated tree may be reduced. Such reduction of maintenance effort may be a result of an illuminated tree powered from a battery adapted to provide a sufficient period of illumination each display season day. Some embodiments may supply battery power to a user's existing illuminated artificial tree. This facilitation maybe a result of adapting a support structure to connect the artificial tree to a battery in the support structure. For example, an artificial tree base retaining a battery may be electrically connected to an existing artificial tree.

The details of various embodiments are set forth in the accompanying drawings and the description below. Other features and advantages will be apparent from the description and drawings, and from the claims.

BRIEF DESCRIPTION OF THE DRAWINGS

FIG. 9 depicts a perspective view of an embodiment lighted tree battery holder.

FIG. 10 depicts a perspective view of an embodiment lighted tree battery holder.

Like reference symbols in the various drawings indicate like elements.

DETAILED DESCRIPTION OF ILLUSTRATIVE EMBODIMENTS

To aid understanding, this document is organized as follows. First, an exemplary battery-powered lighted tree is briefly introduced with reference to FIG. 1. Second, with reference to FIGS. 2-6, the discussion turns to exemplary embodiments that illustrate battery-powered artificial tree base structural and electrical design. Specifically, various implementations of an artificial tree base, formed from a battery, and a structure adapted to mechanically support the trunk and electrically connect the trunk to the battery, are disclosed. Then, with reference to FIG. 7, illustrative electrical and control designs of an exemplary battery-powered lighted tree base are described. Finally, with reference to FIGS. 8-12, illustrative examples of embodiment battery holders are disclosed.

Figure 1:
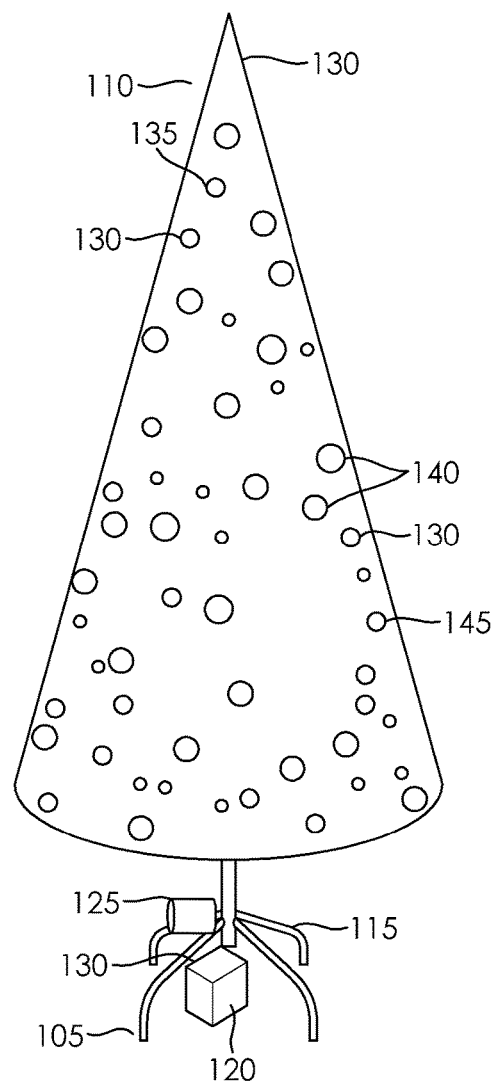
FIG. 1 depicts an exemplary battery-powered lighted tree formed from an artificial tree trunk adapted to be mechanically supported and electrically connected to a support structure external to the tree, artificial tree branches extending from the trunk, a light source disposed to emit light from a branch and electrically connected to the trunk, and a base, formed from a battery, and a structure adapted to mechanically support the trunk and electrically connect the trunk to the battery.

FIG. 1 depicts an exemplary battery-powered lighted tree formed from an artificial tree trunk adapted to be mechanically supported and electrically connected to a support structure external to the tree, artificial tree branches extending from the trunk, a light source disposed to emit light from a branch and electrically connected to the trunk, and a base, formed from a battery, and, a structure adapted to mechanically support the trunk and electrically connect the trunk to the battery. In FIG. 1, the base 105 mechanically supports the lighted artificial tree 110 via the structural support 115. The base 105 may electrically connect the lighted artificial tree 110 to the battery holder 120. The battery holder 120 may include an electrical connection to a battery which may be retained within the battery holder 120. In various embodiments, the lighted artificial tree 110 may be composed from rotationally coupled sections electrically connected with the battery holder 120 in the base 105, and optically coupled with a light source disposed in the base to illuminate the tree. The battery holder 120 may be in the form of a gift box disposed below the lighted artificial tree 110. The lighted artificial tree 110 may electrically connect the light source 125 to the battery holder 120. In some embodiments, the light source 125 may be an LED (Light Emitting Diode) light source. The light source 125 may be disposed within the base and optically coupled with optic fibers 130 configured to illuminate the lighted artificial tree 110. The mini-LEDs 135 and flash-able mini-LEDs 140 may be electrically connected to the battery holder 120 by the lighted artificial tree 110, and configured to illuminate the lighted artificial tree 110. The light source 125 may be optically coupled with the tree fibers 145. The tree fibers 145 may be disposed to emit visible light from the lighted artificial tree surface. In an illustrative example, apparatuses and methods to rotationally and optically couple electrically connected artificial tree trunk sections to electrical power and light sources disposed in a base are described using optical, electrical, and mechanical techniques such as those disclosed with reference U.S. Provisional Patent Application No. 62/406,132 entitled "EVIRO-LIGHTS TREE," filed by Michael M. McRae on Oct. 10, 2016, the entire contents of which are herein incorporated by reference.

Figure 2:
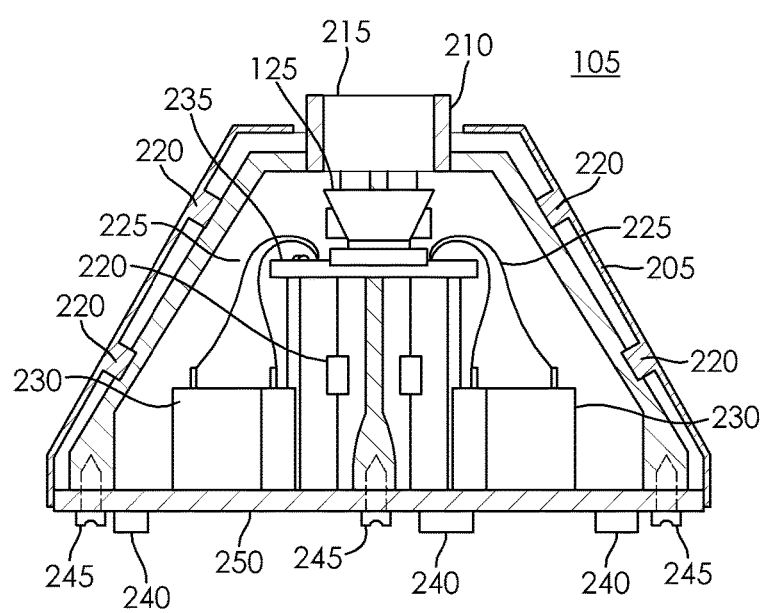
FIG. 2 depicts a cross-sectional side view of an embodiment battery-powered lighted tree base.

FIG. 2 depicts a cross-sectional side view of an embodiment battery-powered lighted tree base. In FIG. 2, the base 105 structural support 205 mechanically supports the trunk support rib 210 retaining the trunk collar 215. In an exemplary scenario of use the trunk collar 215 may secure an artificial tree trunk inserted within the trunk collar 215. In the depicted embodiment, snap tabs 220 removably attach the base 105 structural support 205 to the trunk support rib 210. In the depicted embodiment, battery leads 225 electrically connect the light source 125 to the battery 230. The base 105 may include control circuit 235. The control circuit 235 may be adapted to activate the light source 125 to emit various illumination patterns and sequences. The control circuit 235 may be operably coupled with the light source 125 and electrically connected to the battery 230. The bottom of the base 105 may be supported by feet 240 and secured by screws 245 to base plate 250.

Figure 3:
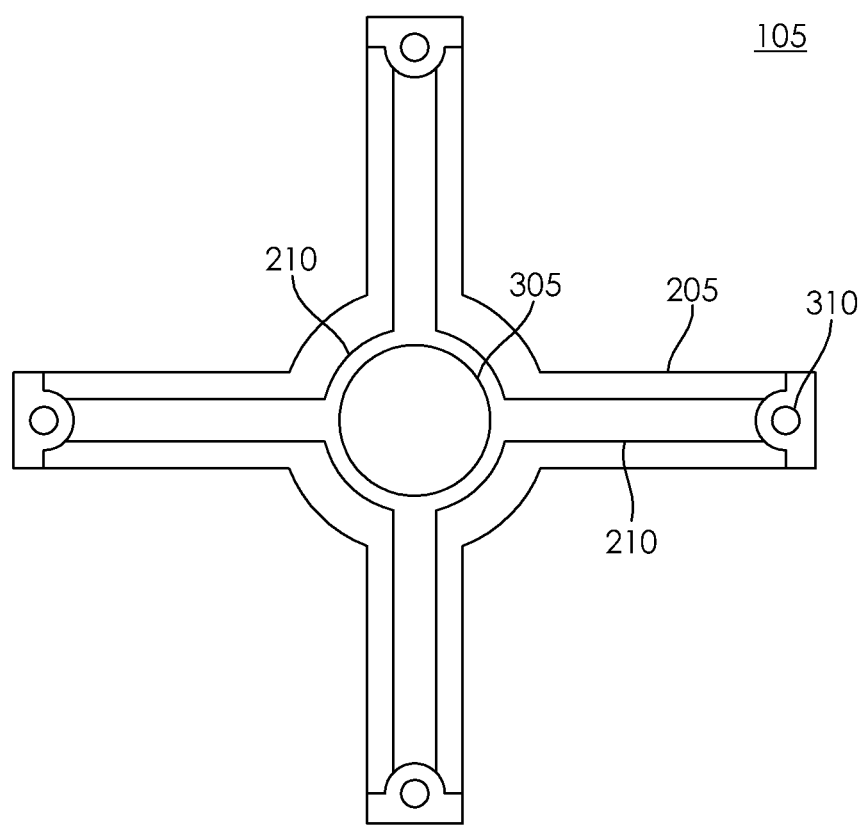
FIG. 3 depicts a bottom view of an embodiment battery-powered lighted tree base structural support.

FIG. 3 depicts a bottom view of an embodiment battery-powered lighted tree base structural support. In FIG. 3, structural support 205 extends to the bottom of the base 105 to mechanically secure the trunk support rib 210 and retain the tree trunk tube 305. The structural support 205 may be securable to the base 105 via screw hole 310.

Figure 4:
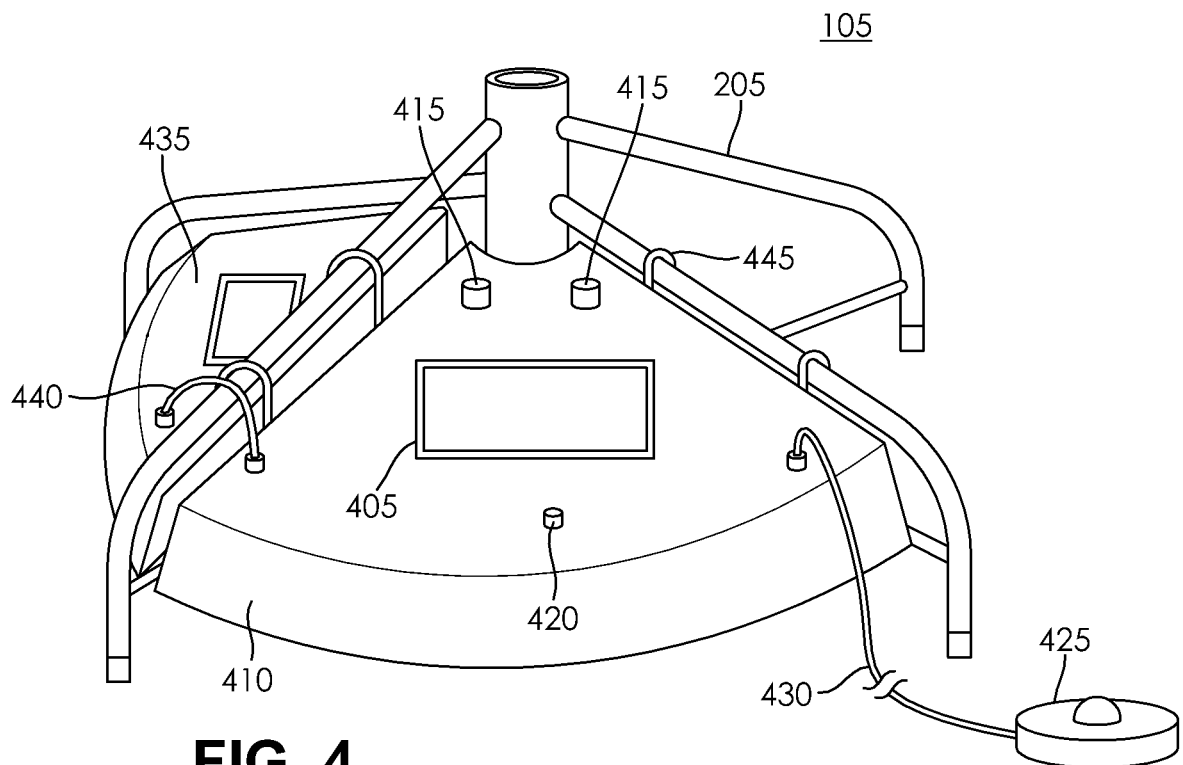
FIG. 4 depicts a perspective side view of an embodiment battery-powered lighted tree base.

FIG. 4 depicts a perspective side view of an embodiment battery-powered lighted tree base. In FIG. 4, the base 105 is configured with a battery compartment 405 to provide access to a battery retainable within the battery controller and housing 410. The connectors 415 may provide electrical connection from the battery controller and housing 410 to a lighted artificial tree which may be attached to the base 105 in an exemplary scenario of use. In some embodiments, the battery controller and housing 410 may include a control circuit adapted to activate various illumination patterns and sequences emitted from an attached lighted artificial tree. In the depicted embodiment, switch 420 may be operably coupled with the battery controller and housing 410 to activate and control illumination of an attached lighted artificial tree. The foot switch 425 may be operably coupled via control cable 430 with the battery controller and housing 410 to activate and control illumination of an attached lighted artificial tree. An additional battery unit 435 may provide electrical connection attachable to a battery retainable within battery controller and housing 410 in exemplary scenarios of use. The additional battery interconnect cable 440 may electrically connect additional battery units 435, bridging structural support 205. In an illustrative example, embodiment designs having series or parallel electrical connection of additional battery units are contemplated. In the depicted embodiment, a tree stand securing hook 445 securely connects structural support 205 to the base 105.

Figure 5:
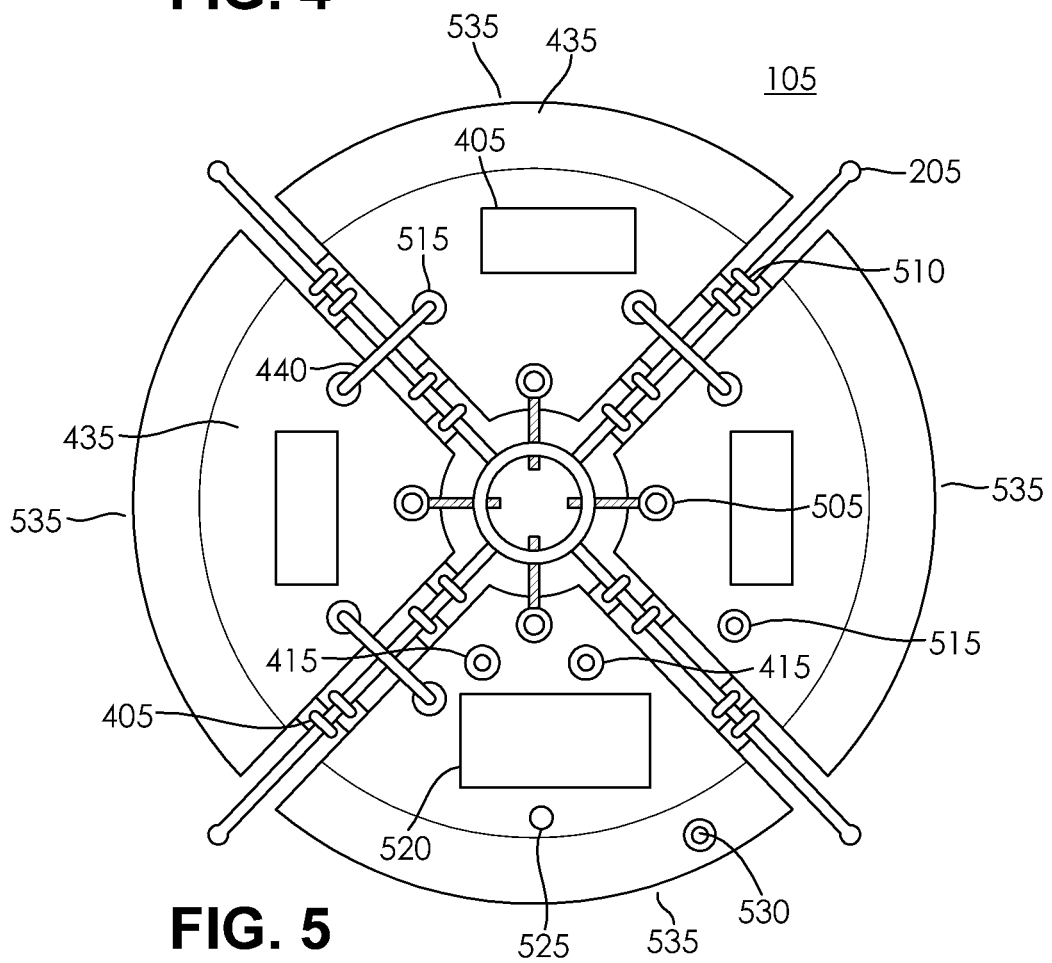
FIG. 5 depicts a top view of an embodiment battery-powered lighted tree base formed from quarter-sections.

FIG. 5 depicts a top view of an embodiment battery-powered lighted tree base formed from quarter-sections. In FIG. 5, tree securing screw 505 may be rotationally tightened to horizontally secure an artificial tree attached to the base 105 in exemplary scenarios of use. The unit J-bolt 510 may removably attach the structural support 205 to the base 105. The battery interconnect connectors 515 may electrically connect additional battery units 435 via connectors 415 and additional battery interconnect cable 440. The additional battery units 435 may be accessible via battery compartments 405. The base 105 may be composed of quarter-sections. Four quarter-section battery compartments 520 may provide access to battery, illumination, and control apparatus configured to activate lighting patterns and sequences in an illuminated artificial tree attachable to the base 105 in exemplary scenarios of use. A pattern-plus-power switch 525 and foot pedal connector 530 may be operably coupled with the quarter-section battery and control tree base unit 535 to activate and control illumination of a lighted artificial tree attachable to the base 105.

Figure 6:
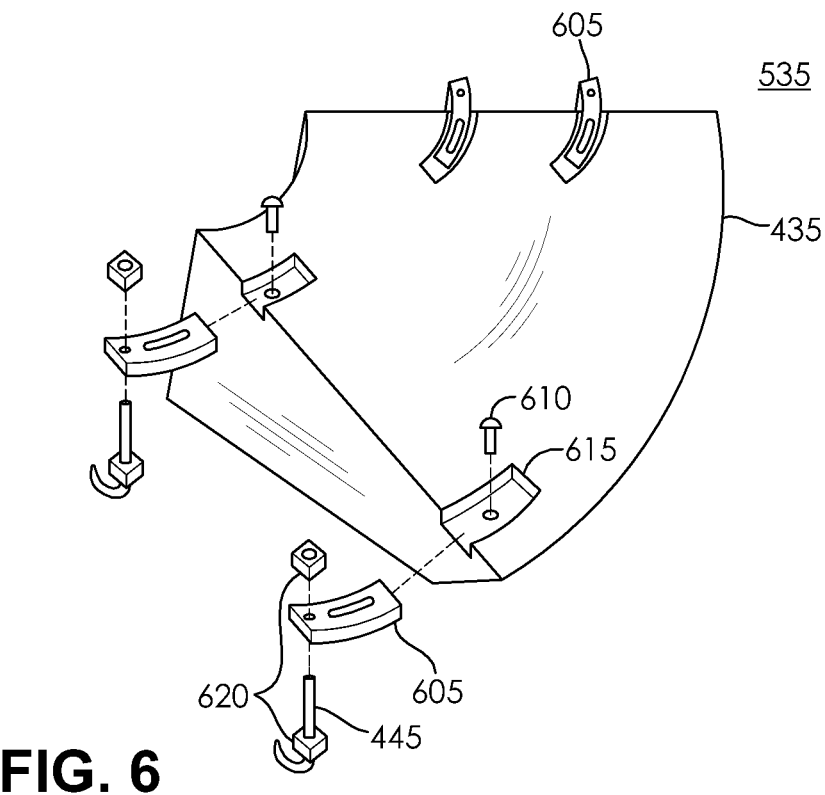
FIG. 6 depicts a perspective bottom view of an embodiment battery-powered lighted tree base quarter-section.
Figure 7:
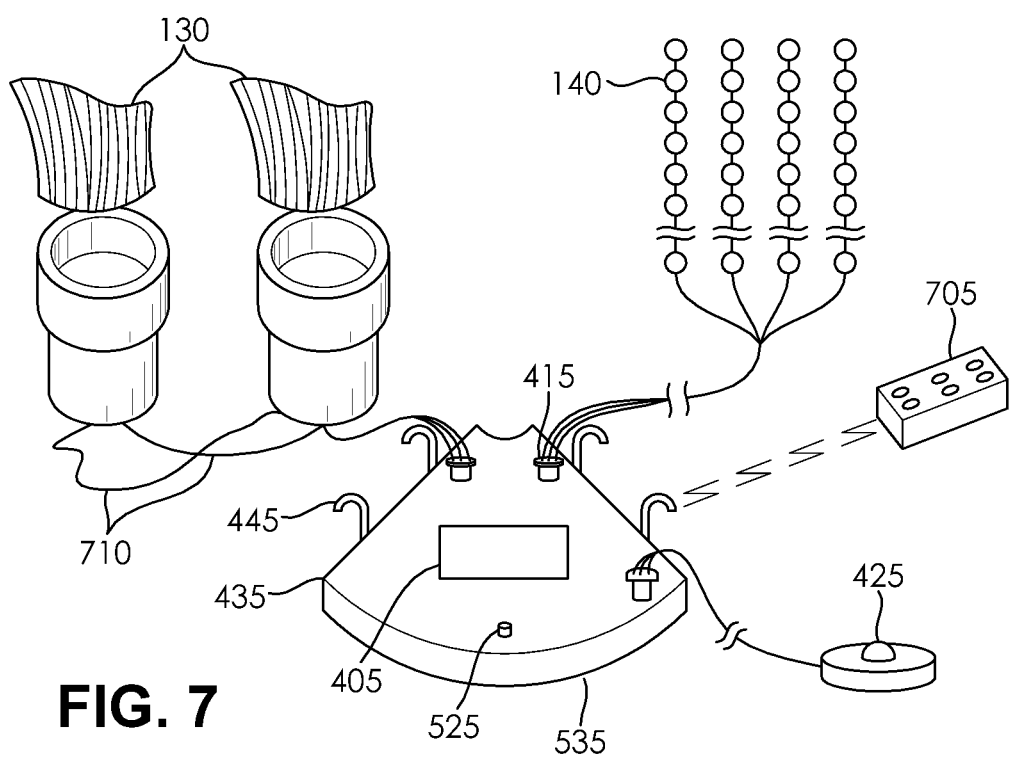
FIG. 7 depicts an exemplary electrical and control interconnect design using an embodiment battery-powered lighted tree base quarter-section.

FIG. 6 depicts a perspective bottom view of an embodiment battery-powered lighted tree base quarter-section. In FIG. 6, the quarter-section battery and control tree base unit 535 retains additional battery units 435 electrically connected via additional battery interconnect cable 440 to power an attachable illuminated artificial tree in exemplary scenarios of use. In some embodiments, more than one quarter-section battery and control tree base unit 535 may be interconnected to form a base. In the depicted embodiment, the quarter-section battery and control tree base unit 535 may be removably attachable with another like unit via mechanical connection of bracket 605 and securing screw 610. The mounting hardware channel 615 may retain the bracket 605 which may, for example, interlock more than one quarter-section battery and control tree base unit 535 to form a base 105, as depicted in FIGS. 4 and 5. With reference to FIG. 5, more than one quarter-section battery and control tree base unit 535 may be secured to the structural support 205 to form a base 105, using a stand j-hook securing assembly 620.

FIG. 7 depicts an exemplary electrical and control interconnect design using an embodiment battery-powered lighted tree base quarter-section. In FIG. 7, the quarter-section battery and control tree base unit 535 retains the additional battery unit 435 and battery compartment 405 electrically connected via connectors 415 with the flash-able mini-LEDs 140. The foot switch 425 and pattern-plus-power switch 525 may be operably coupled with the flash-able mini-LEDs 140 to activate various illumination patterns and sequences. The remote control 705 may be communicatively coupled with the quarter-section battery and control tree base unit 535 to activate various illumination patterns and sequences. With reference to FIG. 5, multiple quarter-section battery and control tree base units 535 may be secured to the structural support 205 to form a base 105, using tree stand securing hook 445. In the illustrated embodiment, optic fibers 130 may be plugged into the top of LED can light 710. The LED can light 710 may include an LED light source optically coupled with the optic fibers 130.

Figure 8:
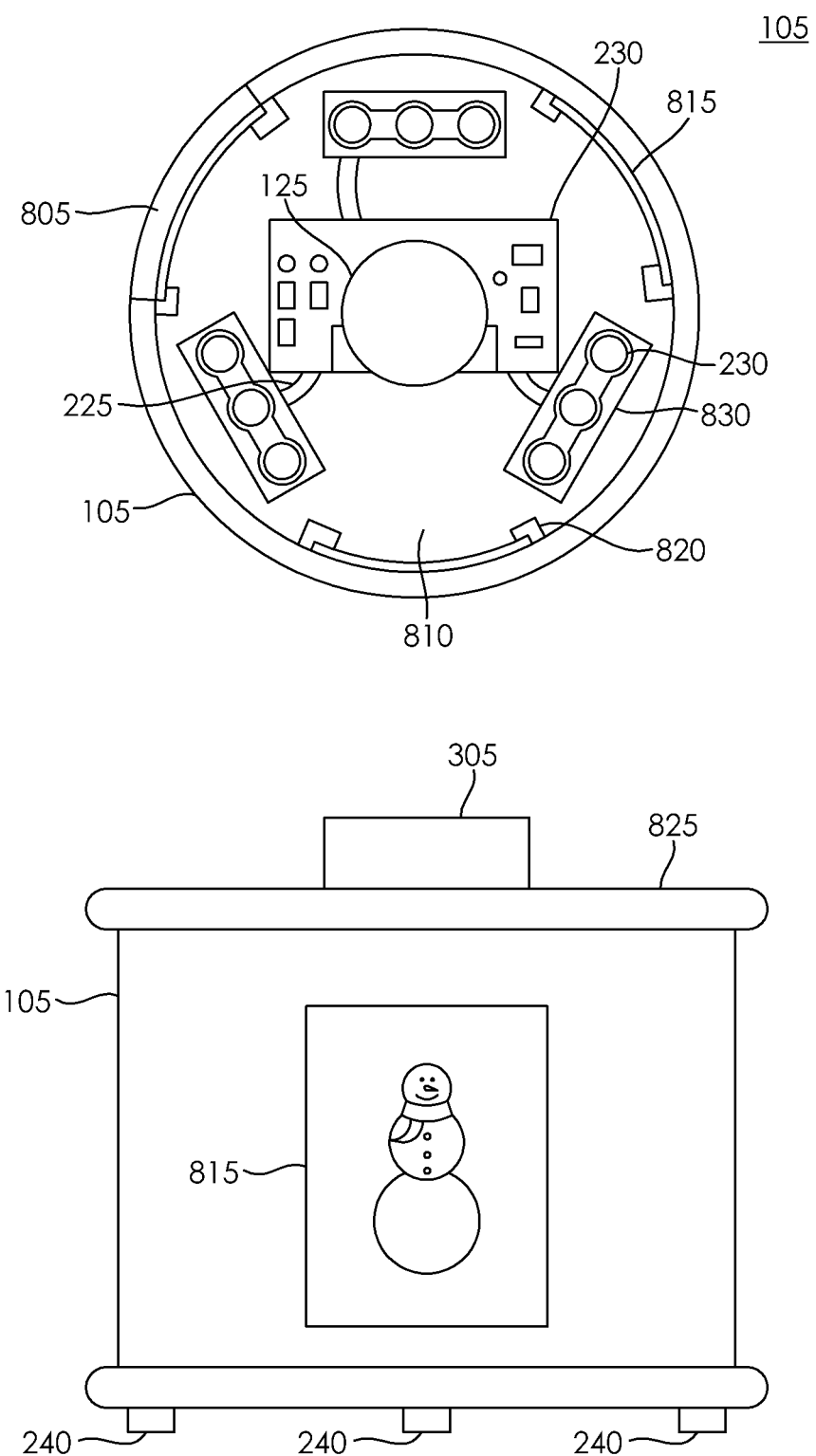
FIG. 8 depicts top and front views of an embodiment lighted tree base retaining an exemplary battery holder.

FIG. 8 depicts top and front views of an embodiment lighted tree base retaining an exemplary battery holder. In FIG. 8, the base 105 retains the light source 125. The light source may be operably and electrically connected to battery 230 via battery leads 225. The base window 805 may conduct stray light 810 emitted from the light source 125. The opaque picture 815 may be illuminated with the stray light 810 emitted from the light source 125. The opaque picture 815 may be removably attached to the base 105 via the picture securing rail 820. The base 105 internal components may be accessible via attach-ably removable lid 825. One or more batteries 230 may be removably secured by the battery holder 830. The attached feet 240 may physically support the base 105. The tree trunk tube 305 may enable attachment of a lighted artificial tree to the base 105.

FIG. 9 depicts a perspective view of an embodiment lighted tree battery holder. In FIG. 9, the depicted battery 230 is concealed within a battery holder disguised as a boxed gift placed near a battery-powered illuminated artificial tree. The gift box 905 may conceal the battery 230 beneath the lid 910 removably attached by the lid latch mechanism 915. The latch detent 920 secures the lid 910 in a closed position. Operating the bow switch 925 may electrically connect the battery 230 to illuminate an attached lighted artificial tree. The lid latch mechanism 915 may be mechanically engaged with the ribbon latch 930 providing a handle operably engaging and disengaging the lid latch to access the battery 230. The decorative ribbon 935 may further enhance the battery holder disguise. In an illustrative example, the battery 230 may be a AA battery or a AAA battery. In the illustrated embodiment, the battery 230 may be electrically connected to an attached lighted artificial tree via electrical continuity with contact strips 940 retained within the gift box 905.

FIG. 10 depicts a perspective view of an embodiment lighted tree battery holder. In FIG. 10, the battery 230 is retained within the battery holder 830 and concealed beneath the lid 910. The battery 230 may be a lantern battery. The lid 910 may be removably attached by the lid latch mechanism 915. Operating the bow switch 925 may electrically connect the battery 230 to illuminate an attached lighted artificial tree. The lid latch mechanism 915 may be mechanically engaged with the ribbon latch 930 providing a handle operably engaging and disengaging the lid latch to access the battery 230. The decorative ribbon 935 may further enhance the battery holder disguise. The battery 230 may be electrically connected to an attached lighted artificial tree via electrical continuity with the lantern battery spring terminal 1005. The lantern battery holder support strap 1010 may mechanically reinforce the disguised battery holder to more securely retain the heavier lantern battery. The decorative ribbon strap 1015 may aid in concealing the lid latch mechanism 915.

Figure 11:
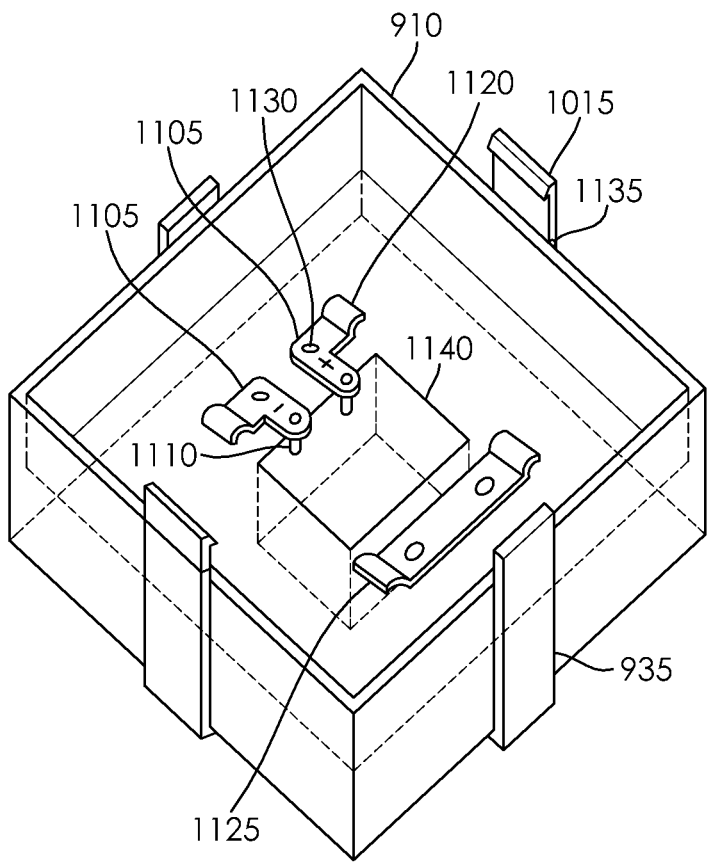
FIG. 11 depicts a perspective view of an embodiment lighted tree battery holder.

FIG. 11 depicts a perspective view of an embodiment lighted tree battery holder. In FIG. 11, the lid 910 conceals internal components of a battery holder disguised as a boxed gift with the externally attached decorative ribbon 935. The decorative ribbon strap 1015 may aid in concealing the lid 910. A battery retained within the disguised battery holder may be electrically connected to illuminate a lighted artificial tree via electrical continuity with terminal 1105. The lead 1110 and the spring terminal 1120 may be electrically connected to the terminal 1105. An electrical connection to a battery retained within the disguised battery holder may be maintained by mechanical contact pressure to the terminal 1105 by the spring connecting strap 1125. The terminal 1105 may be mechanically secured within the battery holder via attachment by screw 1130. A spring hinge 1135 may positively retract the lid 910 to the closed position to enhance safety by avoiding inadvertent human contact with electrical components including the controls 1140.

Figure 12:
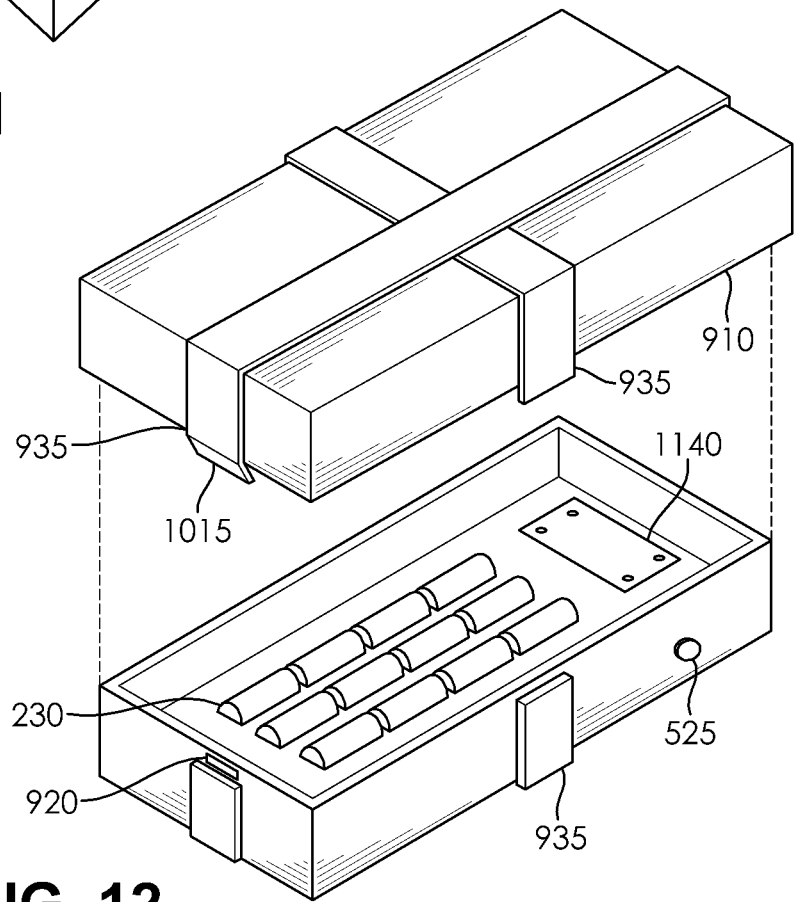
FIG. 12 depicts a perspective view of an embodiment lighted tree battery holder.

FIG. 12 depicts a perspective view of an embodiment lighted tree battery holder. In FIG. 12, the battery 230 is concealed by the lid 910 within a battery holder disguised as a boxed gift by the decorative ribbon 935 and the decorative ribbon strap 1015. The battery 230 may be a variety of sizes based on power requirements. The pattern-plus-power switch 525 may operably engage controls 1140 to electrically couple the battery 230 to an attached lighted artificial tree, to activate the tree to emit various illumination patterns and sequences.

Although various embodiments have been described with reference to the Figures, other embodiments are possible. For example, in some embodiments, a fiber optic tree may be illuminated by two led arrays in cans that have the optical fibers plugged into the top of the cans. In various designs, the power for these LEDs may be supplied by 12 "d" cell batteries (18 VDC), thru a control and sequencing switch. In various implementations, the system may operate with sufficient light for 28 days at 5 to 6 hours a day. In an illustrative example, the brightness may slowly deteriorate over time as all battery powered led strings do. In some designs, such as wreaths, baskets, or swags, an effective illumination may be obtained for about 10 to 20 days at 5 to 6 hours a day of operation. However, in various examples, a tree with a larger quantity of batteries may have to run for a longer period of time to avoid customer dissatisfaction, based on replacing the batteries more than once in a season, for average usage. In view of this, in some embodiments, a goal may be to develop a lighting system that would last on batteries for 4 weeks, at 5 to 6 hours per day of illumination. In some designs, "glitter" LED lights may last for extended periods with "D" cell batteries, even with large quantities of lights. In some designs, 4 sets of 66 "glitter" lights may be used, with each set having its own control for 18 Volts DC. In an illustrative example, glitter lights may be easy to work with, but may need to have more space between LEDs to be used in a prelit tree. In various implementations, "glitter" led strings could be used for lighting a tree if a larger tree is considered.

In some designs, mini led strings (140 LEDs) using 6 "D" cell batteries, or 210 LEDs with 9 "D" cell batteries, may be advantageously employed to obtain a sufficient period of illumination. In various embodiments, a series of housings for the batteries and LED controls may be formed from quarter sections that clamp on to the legs of a standard tree stand. In some embodiments, the first base unit houses the controls, and a first set of batteries. In various designs, added sections are for additional batteries that may be needed depending on the number and size of the batteries required. In an illustrative example, this design has flexibility for adjustment to fit a variety of tree stands within a reasonable size range.

In some embodiments, the battery/lighting systems of different led and fiber optic products may be adapted to select battery and lighting to meet customer expectations for brightness and longevity. In some designs, a fiber optic tree may be lit by two cans containing LEDs and a color changing circuit, added in parallel to the power supplying batteries are several strings of flashing tiny "infinity" or "glitter" type LEDs. In an illustrative example, a consideration for this type of tree may be the container for the battery/batteries. In some designs, a container for the battery/batteries may be implemented in the form of decorative "gift boxes" containing batteries and controls, with battery contacts and electrical connections to power the tree.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A battery-powered lighted tree base comprising:
   a plurality of battery units;
   a battery retained within each of the plurality of battery units; and
   a support structure adapted to mechanically support an artificial tree and electrically connect the artificial tree to the battery of each of the plurality of battery units;
   wherein the plurality of battery units are external to the artificial tree; and
   wherein the plurality of battery units are removably attachable from each wherein the plurality of removably attachable battery units are removably attachable four quarter-sections that form the base that is a circular base.

2. The battery-powered lighted tree base of claim 1, wherein each of the plurality of battery units includes electrical controls adapted to control lights in the artificial tree.

3. The battery-powered lighted tree base of claim 1, wherein the plurality of battery units are electrically connected to each other via at least one electrical connection that bridges the support structure.

4. The battery-powered lighted tree base of claim 1, further comprising a plurality of fasteners that fasten the plurality of battery units to a plurality of members of the support structure.

5. The battery-powered lighted tree base of claim 1, wherein the four removably attachable quarter-section batteries are removably attachable to each other via electrical connections and removably attachable to the support structure via a plurality of fasteners.

6. A lighted tree comprising:
   an artificial tree trunk adapted to be mechanically supported and electrically connected to a support structure external to the artificial tree;
   a plurality of artificial tree branches extending from the trunk;
   at least one light source disposed to emit light from a branch, the at least one light source electrically connected to the trunk; and
   a base formed from a plurality of removably attachable battery units, each of the plurality of removably attachable battery units including a battery that is electrically connected to the artificial tree trunk;
   wherein the plurality of removably attachable battery units are external to the artificial tree wherein the plurality of removably attachable battery units are removably attachable four quarter-sections that form the base that is a circular base.

7. The lighted tree of claim 6, wherein the at least one light source further comprises an LED array.

8. The lighted tree of claim 6, wherein: the lighted tree further comprises a light emitter optically coupled with the at least one light source; and, the light emitter is an optical fiber.

9. The lighted tree of claim 6, wherein the lighted tree further comprises a container retaining the at least one light source, and the light source is plugged into the container.

10. The lighted tree of claim 6, wherein the at least one light source further comprises a multiplicity of glitter type LED sets, each set of glitter lights having its own control.

11. The lighted tree of claim 6, wherein the plurality of removably attachable battery units are removably attachable from each other and from the support structure.

12. The lighted tree of claim 6, wherein the plurality of removably attachable battery units are removably attachable four quarter-sections that form the base that is a circular base.

13. A battery-powered lighted tree comprising:
   a battery-powered lighted tree base, comprising:
      a plurality of battery units;
      a battery retained within each of the plurality of battery units; and
      a support structure adapted to mechanically support an artificial tree and electrically connect the artificial tree to the battery of each of the plurality of battery units;
      wherein the plurality of battery units are external to the artificial tree;
      wherein the plurality of battery units are removably attachable from each other; and
   a lighted tree attached to the base, the lighted tree comprising:
      an artificial tree trunk adapted to be mechanically supported and electrically connected to a base;
      a plurality of artificial tree branches extending from the trunk; and
      a plurality of light sources disposed to emit light from the branches and electrically connected with the wherein the plurality of removably attachable battery units are removably attachable four quarter-sections that form the base that is a circular base.

14. The battery-powered lighted tree of claim 13, wherein the battery-powered lighted tree base further comprises a photovoltaic cell adapted to charge the battery.

15. The battery-powered lighted tree of claim 13, wherein the plurality of battery units provide power to illuminate the lighted tree for as many as 4 weeks at 5-6 hours per day.

16. The battery-powered lighted tree of claim 13, wherein the plurality of light sources provide illumination for as many as 4 weeks at 5-6 hours per day.

17. The battery-powered lighted tree of claim 13, wherein the at least one light source further comprises a multiplicity of glitter type LED sets.

18. The battery-powered lighted tree of claim 13, wherein the four removably attachable quarter-section batteries are removably attachable to each other via electrical connections and removably attachable to the support structure via a plurality of fasteners.

\* \* \* \* \*